United States Patent Office 3,132,966
Patented May 12, 1964

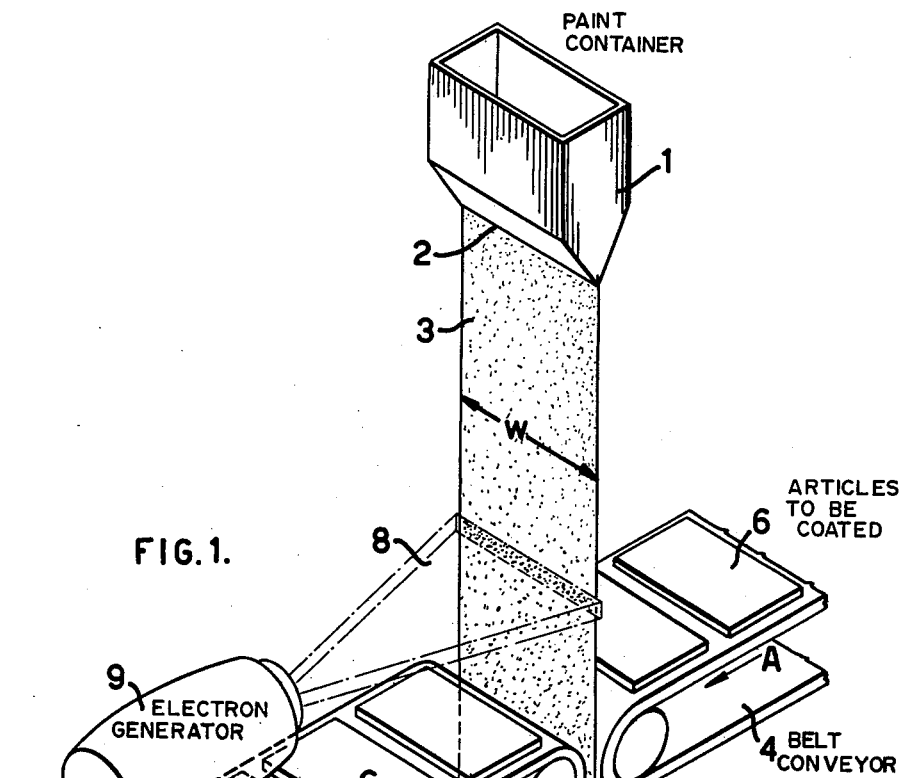

3,132,966
PROCESS OF COATING A SURFACE WITH AN IRRADIATED POLYMERIZABLE MATERIAL
Thomas Picton Hughes and William Henry Thomas Davison, both of Saffron, Walden, Essex, England, assignors to T.I. (Group Services) Limited, Birmingham, England, a British company
Filed Mar. 23, 1961, Ser. No. 97,956
Claims priority, application Great Britain Mar. 24, 1960
10 Claims. (Cl. 117—93.31)

This invention relates to the curing of coatings by the application of ionizing radiation in the form of high energy electrons. It is known to cure polymeric coatings by this technique, for example to coat an article with a liquid polymer and then expose the article to the action of ionizing radiation to cure the coating in situ. However, such a process has its limitations, the chief one being the mechanical difficulty of arranging the article in the path of the beam of electrons or other radiation, especially when the article is of awkward shape.

It has previously been generally considered that radiation-induced reactions in mobile organic systems were complete within a time of the order of a few milliseconds of the application of the radiation, and were therefore for all practical purposes instantaneous. Our invention is based on the discovery that, especially where high intensity beams of electrons are used, i.e., beams having an intensity such that a ten or fifteen megarad dose can be deposited in less than one second, post-irradiation reactions extending over an appreciable time can be observed in a wide range of polymerizable systems.

It is now proposed therefore according to the invention, to provide a cured coating on an article or surface by exposing a liquid polymeric coating material of a kind that undergoes radiation curing to the action of a beam of electrons of intensity and dosage sufficient eventually to cause at least partial curing of the material, and then subsequently applying this irradiated material to the article or surface, this subsequent application being performed before the curing process initiated by the beam of electrons has proceeded far enough to cause gelation of the material.

This means that it is no longer necessary to expose the article or surface itself to the ionizing radiation, and it allows the exposure of the coating to the irradiation and the coating of the article or surface to be treated largely independently of one another, so that each can be arranged in the most efficient way.

The invention generally requires an electron source capable of irradiating the coating material at an instantaneous dose-rate of over ten megarads per second, so that the time of irradiation is short compared with the time between irradiation and gelation.

In general, the types of coating material suitable for curing by irradiation, e.g., unsaturated polyesters blended with reactive monomers such as styrene, have reactions the speeds of which make them suitable for this process. However, where necessary the speed of reaction can be reduced in any one of several ways. For example, in order to increase the flow that takes place before gelation, the reaction can be slowed down by the use of monomers that are made less reactive by the introduction of less reactive groups such as allyl groups. Instead, the reaction can be slowed down by increasing the viscosity of the coating, or by applying it at a lower temperature than normal, or two or more of these methods may be combined. If on the other hand the reaction is too slow so that an excessive time is required before complete cure, the reactions can be speeded up by including more reactive grouping, e.g., vinyl groups, or by raising the temperature or lowering the viscosity of the material.

In a preferred way of carrying out the process according to the invention the irradiation is carried out whilst the coating material is freely suspended or falling in the atmosphere between its point of storage or delivery and its point of contact with the article or surface. For example, the material may be irradiated whilst it is falling freely under gravity from a storage container onto the article or surface, or it may be irradiated whilst in the form of a spray issuing from a paint-spraying gun. The irradiation gives a sufficient dosage in relation to the coating material used and the temperature and other conditions, to ensure that gelation occurs as soon as the coating has distributed itself over the article, but the intensity is sufficient to give a time delay that ensures that gelation does not occur before the coating has distributed itself over the article. The articles may be carried in succession past the point of application on a conveyor, and it is arranged that the curing is complete by the time they reach the end of the conveyor, for example in about one minute.

As a source of ionizing radiation, we may use a generator capable of generating a beam of electrons with a current of at least one milliampere the electrons having an energy of not more than 500 kev.

To avoid wastage the apparatus may be arranged so that the beam of electrons stops when an article is not present, whether or not the flow of coating material continues. Where the coating is to be deposited electrostatically, advantage may be taken of the negative charges which the electrons induce on the droplets of coating material by positively charging the article to be coated.

Both the irradiation and the application of the coating, to the base material, may be carried out in the normal atmosphere, or in an inert atmosphere, for example of nitrogen, carbon dioxide or argon, and at any convenient pressure.

The invention will be further illustrated by way of example with reference to the accompanying drawings, in which:

FIGURE 1 shows diagrammatically a layout for irradiating the coating whilst it is falling under gravity in the form of a curtain; and FIGURE 2 shows the application of the invention to coating by spraying.

Referring first to FIGURE 1, the layout shown is suitable for applying a coating in the form of a curtain to a succession of discrete obects. The coating material, which is a polyester-based paint incorporating styrene as the monomer, and having a viscosity of about 5 poises at the temperature of application, that is at 50° C., is forced under pressure within a rectangular container 1, through a slot 2 from which the paint issues in the form of a curtain 3, which is three inches wide and bounded by vertical guide wires.

The rate of delivery of the paint and the stability of the curtain are controlled by varying the pressure and slot width. The freely falling curtain of paint passes between two belt conveyor sections 4 and 5 which are driven in the direction of the arrows A and carry a succession of articles 6 to be coated. Any paint that passes the articles is collected by a container 7.

The upper surfaces of the articles 6 are about eight inches below the slot 2, and at a level about two inches above the articles 6 the curtain 3 is exposed to the action of a beam 8 of electrons from a suitable electron generator 9. It delivers a beam of electrons of up to 180 kev. energy, the maximum total beam current available being 20 milliamperes. In the arrangement described, the line of action of the beam is horizontal and perpendicular to the plane of the curtain 3; the beam is scanned horizontally to cover the width of the curtain 3 and to overlap it at the edges by about a quarter of an inch.

With the slot 2 adjusted to a width of 0.015 in., the pressure is adjusted to give a stable curtain which applies a 0.002 in. thickness coating to articles travelling through the curtain at 400 ft./min. The thickness of the curtain 3 at this setting is such as to be adequately penetrated by electrons having an energy of 120 kev., so the generator 9 is adjusted to this output and with a beam current of 15 milliamperes the intensity is such as to cause the coating to be cured to a tack-free condition within less than two seconds.

In order to prevent inhibition of the cured coating, the whole of the apparatus described, or only the curtain 3, may be enclosed in an insert atmosphere, for example, of nitrogen, argon or carbon dioxide.

The ararngement shown in FIGURE 2 employs a standard form of paint-spraying gun 10, applying an unsaturated polyester based paint to an article 11, the paint having initially a viscosity of about 4 poises and being thinned as required with solvents. Between the nozzle of the gun 10 and the article 11 the droplets of paint are subjected to the action of a beam of electrons from a generator 12 which may be of the same type as the generator 9 of FIGURE 1. The beam impinges on the spray of paint about two inches from the surface of the article 11, and it is found that adequate penetration of the spray is achieved with electrons having an energy of 100 kev. By adjustment of the distance of the gun 10 from the article 11, and adjustment of the beam current of the generator 12, a cured coating of good appearance and properties, which is hard and track-free within one minute, can be obtained.

Where the coating is sprayed, it may be possible to employ electrostatic spraying techniques, in that a positive potential may be applied to the article, so that the droplets, which have a negative charge induced on them by the beam of electrons, are attracted electrostatically towards it.

In either of the arrangements described, provision may be made to ensure that the generator 9 or 12 is switched off when an article 6 or 11 is not present in the path of the paint, thus saving not only power, but also paint, since any unirradiated paint can be used again.

The curing may be accelerated by heating the coating material before irradiation, or after application, either by preheating the material being coated, or heating the coated strip immediately after application.

It will be understood that the invention is not limited to particular polymers but may be applied to any polymer coatings that undergo curing by irradiation from a beam of electrons, and for which conditions can be arranged to give enough delay between the irradiation and the resulting gelation and cure. Of particular interest as coating materials for this purpose are polymers containing olefinic unsaturation, either alone or mixed with reactive monomers, and we may use polymers based on polysiloxanes, preferably those containing less than 5% by weight of SiH groups or of unsaturated substituents.

We claim:
1. A process of coating a surface with cured polymer material which comprises:
    (a) exposing a liquid coating composition containing an unsaturated polymerizable organic coating material to a beam of electrons having an energy between about 100 and 500 kev. to impart to said coating composition an ionizing radiation dose rate of at least about 10 megarads per second for a time sufficient to induce polymerization,
    (b) applying said irradiated coating composition before polymerization initiated by said irradiation has caused gelation of the composition to a surface, and
    (c) allowing said applied coating composition to cure to a track-free condition upon said surface.

2. A process as claimed in claim 1 wherein said exposure step (a) is automatically terminated when a surface to be coated is not in position to receive application of coating composition in accordance with step (b).

3. A process as claimed in claim 1 wherein said coating composition is surrounded by an atmosphere of inert gas during said steps (a) to (c).

4. A process as claimed in claim 1 wherein said step (c) comprises the application of heat to the coating composition to aid in the completion of the cure.

5. A process of coating a surface with a cured polymer material which comprises:
    (a) providing a liquid coating composition containing an unsaturated polymerizable organic coating material,
    (b) forming a stream of said coating composition by forcing the composition through an orifice,
    (c) exposing said stream to an ionizing radiation dose rate of at least about 10 megarads per second of a beam of electrons having an energy between about 100 and 500 kev. so that the coating composition receives an irradiation dosage sufficient to induce polymerization,
    (d) imposing a surface to be coated in the path of said stream downstream of said irradiation exposure in such manner as to apply a thin coating of the irradiated coating composition upon the surface before the coating composition attains a jelled condition, and
    (e) allowing the coating composition applied in step (d) to cure to a track-free condition upon said surface.

6. A process as claimed in claim 5 wherein said stream is a spray of individual droplets of the coating composition.

7. A process as claimed in claim 5 wherein said stream is a continuous stream of the coating composition that falls freely under gravity from said orifice.

8. A process of coating a surface with a cured polyester resin which comprises:
    (a) providing an unsaturated polyester based paint having a viscosity of about 4 poises,
    (b) spraying a stream of droplets of said paint from a spray nozzle,
    (c) placing a surface to be coated in said spray of paint in a suitable position to cause the surface to receive a thin coating of the paint,
    (d) impinging a beam of electrons having an energy of about 100 kev. upon said spray about two inches upstream of said suitable position over such a distance of travel of the spray that the paint receives an irradiation dosage sufficient to induce polymerization of said unsaturated polyester, and
    (e) allowing the paint coated article to remain for about 1 minute under curing conditions to cure the coating to a hard, track-free condition.

9. A process of coating a surface with a hard, tack-free polymer coating which comprises:
    (a) providing a coating composition comprising styrene and unsaturated polyester,
    (b) forming an unsupported stream of said coating composition in an atmosphere of insert gas by forcing said composition through an orifice into said atmosphere,
    (c) irradiating said stream with a beam of electrons having an energy between about 100 and 500 kev. and a current of at least one milliampere to give an instantaneous dose-rate of at least 10 megarads per second for such a time that the coating composition receives an irradiation dosage sufficient to induce polymerization of said styrene and unsaturated polyester,
    (d) positioning a surface in said stream downstream of the position of said irradiation of step (c) in such manner as to apply a thin coating of the irradiated coating composition upon said surface before the composition attains a gelled condition, and (e) maintaining said coated surface in an inert gas atmosphere at an elevated temperature until the coating composition applied to said surface has cured to a tack-free condition.

10. A process as claimed in claim 9 wherein said unsupported stream formed in step (b) is a spray of droplets of the coating composition and the surface coated in step (d) is positively charged by application of a positive electrical potential to the article.

References Cited in the file of this patent

UNITED STATES PATENTS

| | | |
|---|---|---|
| 2,429,217 | Brasch | Oct. 21, 1947 |
| 2,670,483 | Brophy | Mar. 2, 1954 |
| 2,746,883 | Powers | May 22, 1956 |
| 2,793,970 | Jeppson | May 28, 1957 |
| 2,921,006 | Schmitz et al. | Jan. 12, 1960 |
| 3,043,760 | Burklin et al. | July 10, 1962 |
| 3,056,735 | Smith-Johannsen | Oct. 2, 1962 |

FOREIGN PATENTS

| | | |
|---|---|---|
| 566,064 | Great Britain | Dec. 12, 1944 |
| 835,121 | Great Britain | May 18, 1960 |